(12) United States Patent
Kim et al.

(10) Patent No.: US 9,225,503 B2
(45) Date of Patent: Dec. 29, 2015

(54) METHOD FOR TRANSMITTING/RECEIVING DATA IN WIRELESS COMMUNICATION SYSTEM AND BASE STATION FOR SAME

(75) Inventors: Jinmin Kim, Anyang-si (KR); Seunghee Han, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 14/111,737

(22) PCT Filed: May 2, 2012

(86) PCT No.: PCT/KR2012/003426
§ 371 (c)(1),
(2), (4) Date: Oct. 14, 2013

(87) PCT Pub. No.: WO2012/150806
PCT Pub. Date: Nov. 8, 2012

(65) Prior Publication Data
US 2014/0050130 A1    Feb. 20, 2014

Related U.S. Application Data

(60) Provisional application No. 61/481,255, filed on May 2, 2011.

(51) Int. Cl.
*H04W 72/04* (2009.01)
*H04L 5/14* (2006.01)
(Continued)

(52) U.S. Cl.
CPC ............ *H04L 5/1469* (2013.01); *H04L 5/001* (2013.01); *H04L 5/0035* (2013.01);
(Continued)

(58) Field of Classification Search
None
See application file for complete search history.

(56) References Cited

U.S. PATENT DOCUMENTS

| 8,780,784 | B2 * | 7/2014 | Chung et al. | 370/315 |
| 2011/0141952 | A1 * | 6/2011 | Wang et al. | 370/294 |
| 2011/0199999 | A1 * | 8/2011 | Nakao et al. | 370/329 |
| 2013/0128826 | A1 * | 5/2013 | Lin et al. | 370/329 |

FOREIGN PATENT DOCUMENTS

| KR | 1020100110272 A | 10/2010 |
| KR | 1020110007585 A | 1/2011 |

(Continued)

Primary Examiner — Chi H Pham
Assistant Examiner — Shick Hom
(74) Attorney, Agent, or Firm — Dentons US LLP

(57) ABSTRACT

In the present invention, a method for transmitting/receiving data in a wireless communication system supporting carrier aggregation/multiple cells and a base station for same are disclosed. More particularly, the method comprises: receiving from the e Node B through a physical downlink control channel (PDCCH) of a first cell resource allocation information, which is set as a flag value indicating uplink resource allocation information, when performing cross-cell scheduling on a second cell through a first cell, according to an uplink-downlink configuration of the first cell from a plurality of cells which are set to a user equipment; determining the resource allocation information as a downlink resource allocation information, when the resource allocation information is received from a subframe perspective in which an uplink transmission time is not defined, based on the uplink-downlink configuration of the second cell; receiving the uplink resource allocation information from the e Node B via a physical downlink shared channel (PDSCH), according to the downlink resource allocation information; and transmitting to the e Node B via a physical uplink shared channel (PUSCH) of the second cell uplink data, according to the uplink resource allocation information.

14 Claims, 12 Drawing Sheets

(51) Int. Cl.
*H04L 5/00* (2006.01)
*H04W 72/12* (2009.01)

(52) U.S. Cl.
CPC ............ *H04L 5/0053* (2013.01); *H04L 5/0094* (2013.01); *H04L 5/0023* (2013.01); *H04W 72/042* (2013.01); *H04W 72/12* (2013.01)

(56) References Cited

FOREIGN PATENT DOCUMENTS

| WO | 2010068069 | A2 | 6/2010 |
| WO | 2010123257 | A2 | 10/2010 |

* cited by examiner

METHOD FOR TRANSMITTING/RECEIVING DATA IN WIRELESS COMMUNICATION SYSTEM AND BASE STATION FOR SAME

This application is a 35 USC §371 National Stage entry of International Application No. PCT/KR2012/003426 filed on May 2, 2012, and claims priority of U.S. Provisional Application No. 61/481,255 filed on May 2, 2011, each of which is hereby incorporated by reference in its entirety.

TECHNICAL FIELD

The present invention relates to a wireless access system, and more particularly, to a method of transmitting/receiving data in a TDD (time division duplex) wireless access system supporting a carrier aggregation or multiple cells and a device supporting the same.

BACKGROUND ART

One of the most significant requirements for the next generation wireless access system is the capability of supporting the high data rate requisite. To this end, many ongoing efforts are made to research and develop various technologies including MIMO (multiple input multiple output), CoMP (cooperative multiple point transmission), relay and the like.

In a wireless access system according to a related art, even if an uplink (UL) and a downlink (DL) are configured to differ from each other in bandwidth, a single carrier is mainly taken into consideration. For instance, a wireless communication system having UL and DL carriers, each of which number is 1, and UL and DL bandwidths generally symmetric to each other is provided based on a single carrier.

Yet, considering the situation that frequency resources are saturated, as a method of securing broadband bandwidths to meet the higher data transmission rate requirements, CA (carrier aggregation/multiple cells) is introduced in a manner of designing each of scattered bandwidths to operate an independent system and aggregating a plurality of bands into a single system.

In this case, a carrier of an independently operable bandwidth unit is called a component carrier (hereinafter abbreviated CC). In order to support an increasing transmission size, 3GPP LTE-A or 802.16 m keeps extending its bandwidth up to 20 MHz or higher. In this case, at least one or more component carriers are aggregated to support the broadband. For instance, if a single component carrier supports a bandwidth of 5 MHz, 10 MHz or 20 MHz, a system bandwidth is supported up to maximum 100 MHz by aggregating maximum 5 component carriers together.

A TDD system supporting a carrier aggregation environment can include an uplink-downlink configuration different from each other depending on each component carrier. If a cross carrier scheduling is performed between component carriers having the uplink-downlink configuration different from each other, a collision occurs between a downlink of a prescribed one component carrier and an uplink of the other component carrier and there may exist a problem of data transmission/reception.

DISCLOSURE OF THE INVENTION

Technical Tasks

One object of the present invention is to provide a method of transmitting/receiving data between an base station and a user equipment in a wireless access system, preferably, in a TDD wireless access system supporting a carrier aggregation and an apparatus therefor.

In case of performing a cross carrier scheduling between component carriers having an uplink-downlink configuration different from each other in a TDD wireless access system supporting a carrier aggregation, another object of the present invention is to provide a method of performing a scheduling for a transmission timing of an uplink or a downlink on each component carrier and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, disclosed herein is a method of transmitting/receiving data in a TDD (time division duplex) wireless access system supporting multiple cells, the method comprising receiving resource allocation information configured with a flag value for indicating uplink resource allocation information via PDCCH (physical downlink control channel) from a base station while performing a cross cell scheduling for a second cell via a first cell according to an uplink-downlink configuration of the first cell among a plurality of cells configured for a user equipment, determining that the resource allocation information is downlink resource allocation information, when the resource allocation information is received at a subframe timing where an uplink transmission timing is not defined based on an uplink-downlink configuration of the second cell, receiving the uplink resource allocation information from the base station via PDSCH (physical downlink shared channel) of the second cell according to the downlink resource allocation information, and transmitting uplink data to the base station via PUSCH (physical uplink shared channel) of the second cell according to the uplink resource allocation information.

To further achieve these and other advantages and in accordance with the purpose of the present invention, according to a different embodiment, disclosed herein is a user equipment configured to transmit/receive data in a wireless access system supporting multiple cells, the user equipment comprising a RF (radio frequency) unit configured to transmit/receive a radio signal; and a processor configured to receive resource allocation information configured with a flag value indicating uplink resource allocation information via PDCCH (physical downlink control channel) from a base station while performing cross cell scheduling for a second cell via a first cell according to an uplink-downlink configuration of the first cell among a plurality of cells configured for a user equipment, the processor further configured to determine that the resource allocation information is downlink resource allocation information, when the resource allocation information is received at a subframe timing where an uplink transmission timing is not defined based on an uplink-downlink configuration of the second cell, the processor further configured to receive the uplink resource allocation information from the base station via PDSCH (physical downlink shared channel) of the second cell according to the downlink resource allocation information, the processor configured to transmit uplink data to the base station via PUSCH (physical uplink shared channel) of the second cell according to the uplink resource allocation information.

Preferably, a subframe in which the PDSCH is transmitted on the second cell corresponds to a subframe which is first available after a subframe in which the PDCCH is transmitted.

Preferably, when the uplink resource allocation information is transmitted together with downlink data, the uplink resource allocation information is joint-coded with the downlink data and transmitted.

Preferably, a modulation and coding scheme (MCS) level used for the joint coding is identical to a MCS level used when the uplink resource allocation information is not transmitted via the PDSCH.

Preferably, a modulation and coding scheme (MCS) level used for the joint coding is determined to be a value for identically maintaining the number of resource used when the uplink resource allocation information is not transmitted via the PDSCH.

Preferably, a modulation and coding scheme (MCS) level used for the joint coding is identical to a MCS level used for PDCCH of a subframe in which the PDSCH is transmitted.

Preferably, a modulation and coding scheme (MCS) level used for the joint coding is identical to a MCS level used for a most recently transmitted PDCCH before the PDSCH is transmitted.

Preferably, a modulation and coding scheme (MCS) level used for the joint coding is identical to a MCS level used for most recently transmitted uplink resource allocation information before the PDSCH is transmitted.

Preferably, the number of resource or a position of a resource region to which the uplink resource allocation information is mapped is predetermined or is configured by a higher layer signaling.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, according to an embodiment of the present invention, data can be smoothly transceived between an base station and a user equipment in a wireless access system, and more preferably, in a TDD wireless access system supporting carrier aggregation.

Secondly, according to an embodiment of the present invention, a cross carrier scheduling can be smoothly performed between component carriers having an uplink-downlink configuration different from each other in a TDD wireless access system supporting carrier aggregation.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Figure 1:
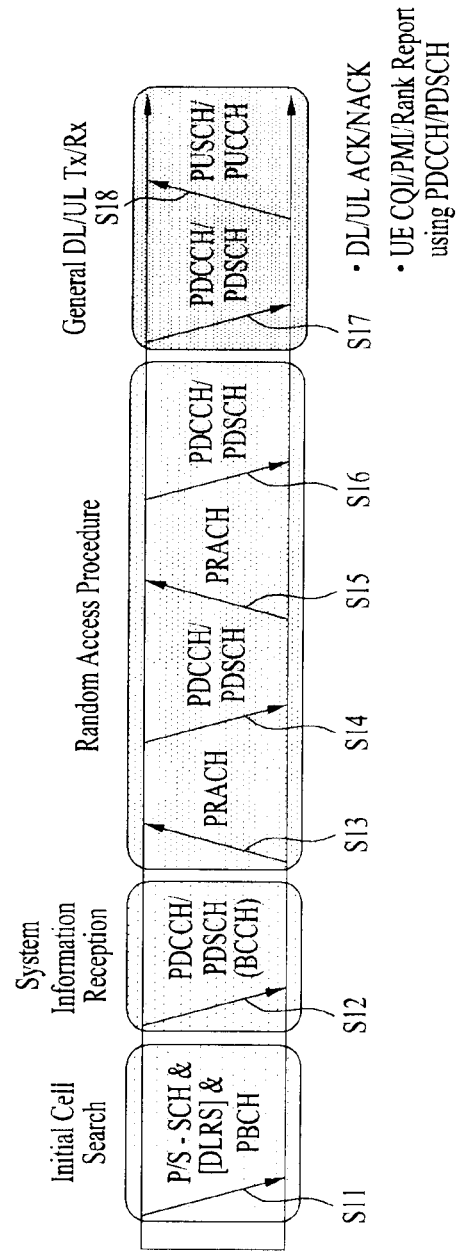
FIG. 1 is a diagram for explaining physical channels used for 3GPP LTE system and a signal transmission method using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, a base station (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable 1.1. The General of System FIG. 1 is a diagram for explaining physical channels used for 3GPP system and a signal transmission using the same.

Referring to FIG. 1, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain detailed system information [S12].

Meanwhile, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
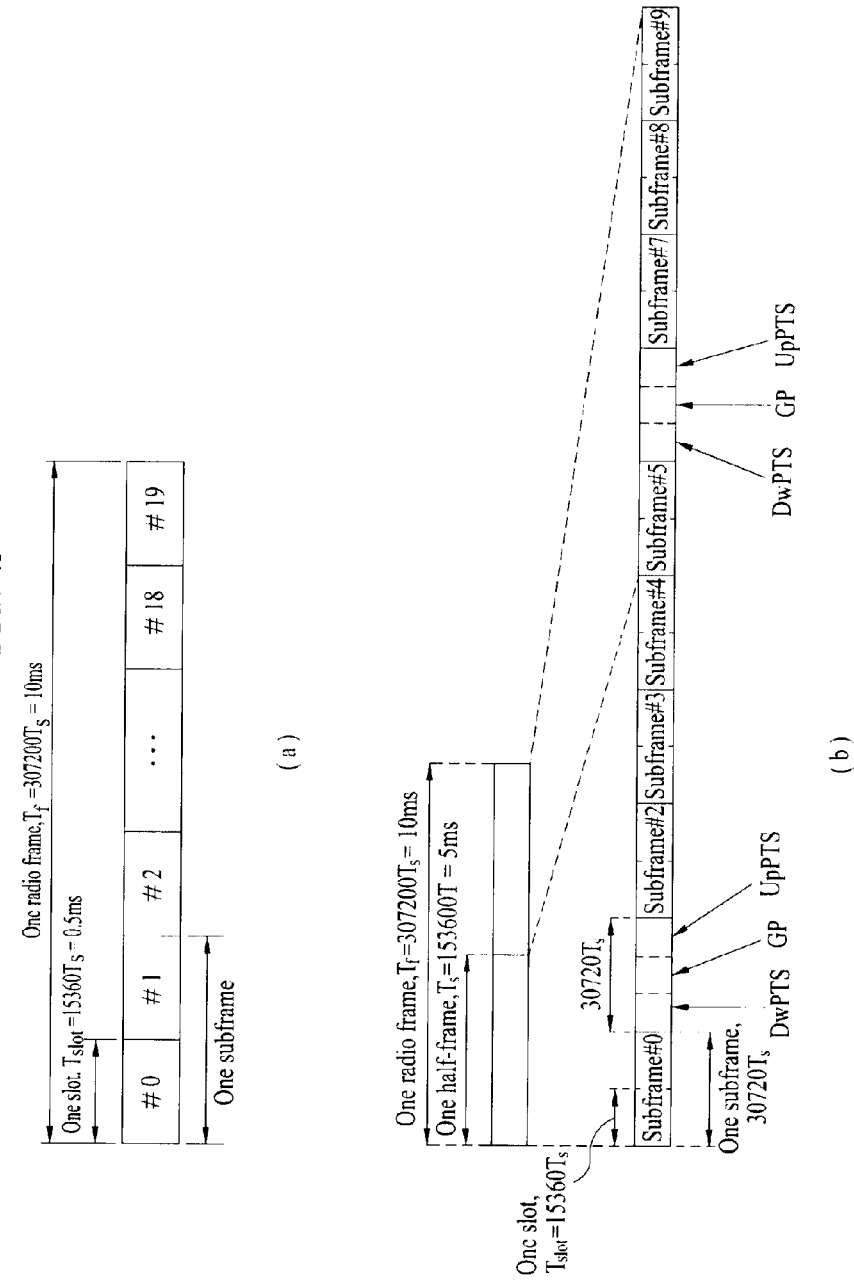
FIG. 2 is a diagram for a structure of a radio frame in 3GPP LTE.

FIG. 2 shows structures of radio frames in 3GPP LTE.

FIG. 2 (a) shows a frame structure type 1. This frame structure type 1 may be applicable to both a full duplex FDD (frequency division duplex) system and a half duplex FDD system.

One radio frame has a length of '$T_f=307200 \cdot T_s=10$ ms' and is constructed with 20 slots to which indexes 0 to 19 are respectively given with an equal length of '$T_{slot}=15360 \cdot T_s=0.5$ ms'. One subframe is defined as two contiguous slots. For example, an $i^{th}$ subframe is constructed with a slot corresponding to '2i' and a slot corresponding to '2i+1'. In particular, a radio frame includes 10 subframes. And, a time taken to transmit one subframe is called a transmission time interval (hereinafter abbreviated TTI). In this case, Ts indicates a sampling time and may be represented as '$T_s=1/(15 \text{ kHz} \times 2048)=3.2552 \times 10^{-8}$ (i.e., about 33 ns)'. One slot may include a plurality of OFDM or SC-FDMA symbols in time domain and may include a plurality of resource blocks (RBs) in frequency domain.

One slot includes a plurality of OFDM (orthogonal frequency division multiplexing) symbols in time domain. Since 3GPP uses OFDMA in downlink, OFDM symbol is provided to indicate one symbol period. The OFDM symbol may be named one SC-FDMA symbol or symbol period. Resource block (RB) is a resource allocation unit and may include a plurality of contiguous subcarriers in one slot.

In the full duplex FDD system, 10 subframes are simultaneously usable for DL and UL transmissions in each 10 ms interval. In doing so, the UL transmission and the DL transmission are separated from each other in frequency domain. On the contrary, in the half duplex FDD system, a user equipment is unable to perform a transmission and a reception at the same time.

The above-described structure of the radio frame is one example only. And, the number of subframes included in a radio frame, the number of slots included in the subframe and the number of symbols included in the slot may be modified in various ways.

FIG. 2 (b) shows a frame structure type 2. The frame structure type 2 is applicable to the TDD system. One radio frame has a length of '$T_f=307200 \cdot T_s=10$ ms' and is constructed with 2 half-frames each of which has a length of '$15360 \cdot T_s=0.5$ ms'. Each of the half-frames is constructed with 5 subframes each of which has a length of '$30720 \cdot T_s=1$ ms'. For example, an $i^{th}$ subframe is constructed with a slot corresponding to '2i' and a slot corresponding to '2i+1', each of which has a length of '$T_{slot}=15360 \cdot T_s=0.5$ ms'. In this case, Ts indicates a sampling time and may be represented as '$Ts=1/(15\ kHz \times 2048)=3.2552 \times 10^{-8}$ (i.e., about 33 ns)'.

The type 2 frame includes a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

Table 1 shows a configuration (length of DwPTS/GP/UpPTS) of a special frame.

Figure 4:
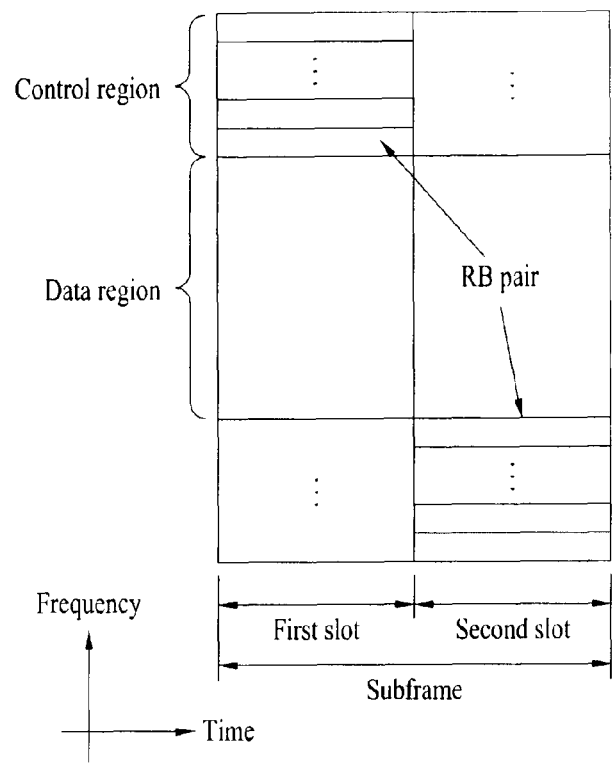
FIG. 4 is a diagram for a structure of an uplink subframe.

Referring to FIG. 4, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 5:
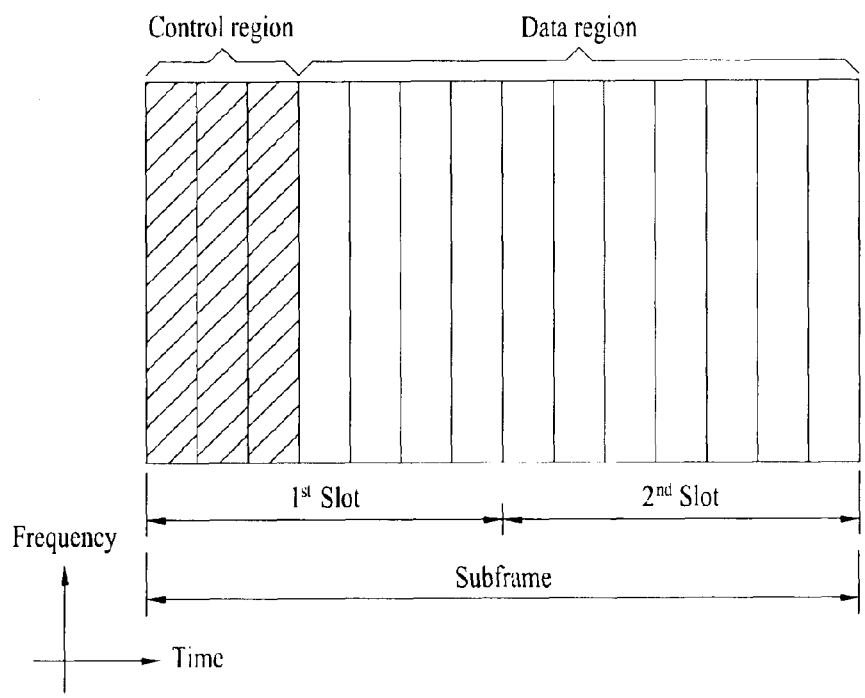
FIG. 5 is a diagram for a structure of a downlink subframe.

FIG. 5 is a diagram for a structure of a downlink (DL) subframe.

Referring to FIG. 5, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat request). Control information carried via PDCCH may be called downlink control information (hereinafter abbreviated

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
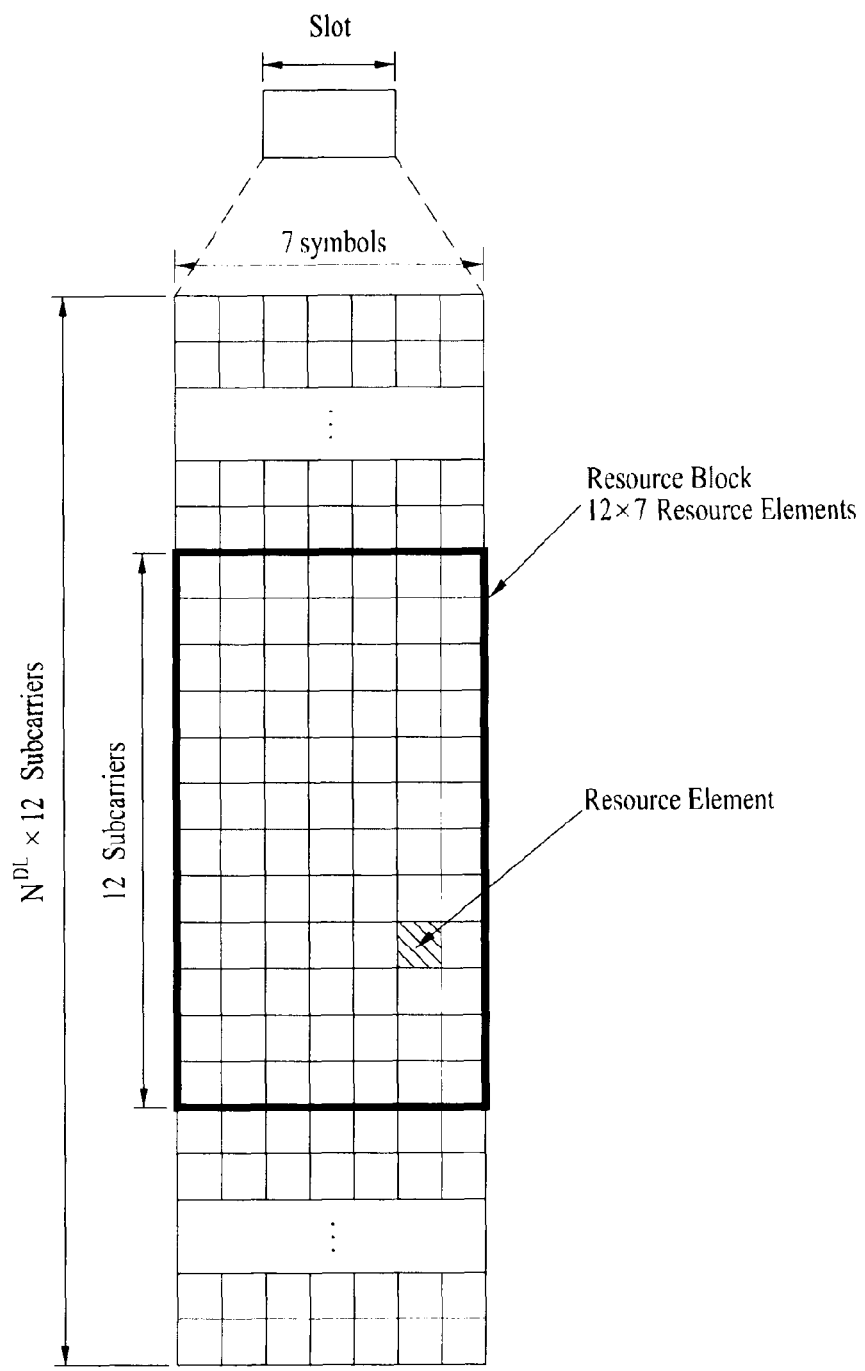
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

FIG. 4 is a diagram for a structure of an uplink (UL) subframe.

DCI). The DCI may include UL resource allocation information, DL resource allocation information or a UL transmission (Tx) power control command for a random UE (user equipment) group.

1.2. PDCCH (Physical Downlink Control Channel)

1.2.1. The General of PDCCH

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to a higher layer control message such as a random access response transmitted via PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). The PDCCH configured with the aggregation of the at least one or more contiguous CCEs undergoes subblock interleaving and may be then transmitted via the control region. CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

1.2.2. PDCCH Structure

A plurality of PDCCHs multiplexed for a plurality of user equipments can be transmitted in a control region. PDCCH is configured with one CCE or the aggregation of at least 2 contiguous CCEs [CCE aggregation]. In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG. In particular, the total number of REGs in OFDM symbol may vary by depending on whether a cell-specific reference signal exists. The concept of REG for mapping 4 resource elements to one group may apply to other DL control channels (e.g., PCFICH, PHICH, etc.). Assuming that REG not assigned to PCFICH or PHICH is set to $N_{REG}$, the number of CCEs available for a system is represented as '$N_{CCE}=\lfloor N_{REG}/9 \rfloor$' and indexes 0 to '$N_{CCE}-1$' are given to the CCEs in order, respectively.

In order to simplify a decoding process of a user equipment, PDCCH format including n CCEs may start with CCE having an index equal to the multiple of n. In particular, if a CCE index is i, the PDCCH format may start with the CCE that satisfies the equation 'i mod n=0'.

In order to configure a single PDCCH signal, a base station may be able to use CCEs, of which number belongs to {1, 2, 4, 8}. In this case, {1, 2, 4, 8} is called a CCE aggregation level. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

Table 2 shows PDCCH format, in which 4 kinds of PDCCH formats are supported in accordance with CCE aggregation levels as depicted in Table 1.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

User equipments differ from each other in CCE aggregation level. This is because a format or MCS (modulation and coding scheme) level of control information carried via PDCCH is different. In this case, the MCS level means a code rate used for data coding and a modulation order. An adaptive MCS level is used for a link adaptation. Generally, in a control channel for transmitting control information, 3 or 4 MCS levels may be taken into consideration.

In the following description, PDCCH is explained in detail. First of all, control information carried via PDCCH may be called downlink control information (DCI). A configuration of information loaded on PDCCH payload may vary in accordance with DCI format. In this case, the PDCCH payload may mean information bit(s). Table 3 shows DCI in accordance with DCI format.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 3, DCI formats may include a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in closed-loop spatial multiplexing mode, a format 2A for PDSCH scheduling in open-loop spatial multiplexing mode, a format 3 for a transmission of a TPC (transmission power control) command for a UL channel, and a format 3A for a transmission of a TPC (transmission power control) command for a UL channel. Moreover, a DCI format 1A is usable for PDSCH scheduling despite that any kind of transmission mode is set for a user equipment.

PDCCH payload length may vary in accordance with DCI format. A PDCCH payload type and a length thereof may vary in accordance with a presence or non-presence of a compact scheduling, a transmission mode configured for a user equipment, or the like.

The transmission mode may be configured in order for a user equipment to receive DL data via PDSCH. For instance, the DL data via PDSCH may include scheduled data for a user equipment, paging, random access response, broadcast information via BCCH and the like. The DL data via PDSCH is related to the DCI format signaled via PDCCH. The transmission mode may be semi-statically configured by a higher layer signaling (e.g., RRC (radio resource control) signaling, etc.). The transmission mode may be categorized into a single antenna transmission and a multi-antenna transmission. A transmission mode is semi-statically configured for a user equipment by the higher layer signaling. For instance, the multi-antenna transmission may include transmit diversity, open-loop spatial multiplexing, closed-loop spatial multiplexing, MU-MIMO (multiuser-multiple input multiple output), beamforming or the like. The transmit diversity is the technology of raising transmission reliability by transmitting the same data via multiple transmitting antennas. The spatial multiplexing is the technology of transmitting high-speed data without increasing a bandwidth of a system by simultaneously transmitting different data via multiple transmitting antennas. The beamforming is the technology of increasing SINR (signal to interference plus noise ratio) of a signal by adding a weight in accordance with a channel state at multi-antenna.

DCI format depends on a transmission mode configured in a user equipment. The user equipment has a reference DCI format of monitoring in a transmission mode configured on its own. The transmission mode configured in the user equipment may correspond to one of 7 transmission modes as follows.

(1) Single antenna port: Port 0
(2) Transmit diversity
(3) Open-loop spatial multiplexing
(4) Closed-loop spatial multiplexing
(5) Multi-user MIMO
(6) Closed-loop rank=1 precoding
(7) Single antenna port: Port 5

1.2.3. PDCCH Transmission

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Subsequently, the base station creates coded data by performing channel coding on the CRC attached control information. In doing so, the channel coding may be performed at a code rate in accordance with a MCS level. The base station performs a rate matching in accordance with a CCE aggregation level assigned to PDCCH format and then generates modulated symbols by modulating the coded data. In doing so, it may be able to use a modulation sequence in accordance with a MCS level. The modulated symbols configuring one PDCCH may have a CCE aggregation level set to one of 1, 2, 4 and 8. Thereafter, the base station maps the modulated symbols to physical resource elements [CCE to RE mapping].

1.2.4. Blind Decoding

A plurality of PDCCHs can be transmitted in a single subframe. In particular, a control region of one subframe is configured with a plurality of CCEs having indexes set to 0 to ($N_{CCE,k}-1$). In particular, the $N_{CCE,k}$ means the total number of CCEs in a control region of $k^{th}$ subframe. A user equipment monitors a plurality of PDCCHs in each subframe. In this case, the verb 'monitor' means that the user equipment attempts decoding of each of the PDCCHs in accordance with a monitored PDCCH format. In a control region assigned within a subframe, a base station does not provide information indicating where a PDCCH corresponding to the user equipment is located. In order to receive a control channel transmitted from the base station, since the user equipment is unable to know that its PDCCH is transmitted in a specific DCI format or on a specific CCE aggregation level at a specific position, the user equipment finds its PDCCH by monitoring an aggregation of PDCCH candidates in a subframe. This is called a blind decoding/detection (BD). According to the blind decoding, a user equipment takes its UE ID (user equipment identifier) from a CRC part by demasking and then confirms whether the corresponding PDCCH is a control channel of the user equipment by checking CRC error.

In an active mode, a user equipment monitors PDCCH of every subframe to receive data transmitted to it. In DRX mode, a user equipment wakes up in a monitoring interval of each DRX period and then monitors PDCCH in a subframe corresponding to the monitoring interval. In doing so, a subframe for monitoring PDCCH is called a non-DRX subframe.

The user equipment should perform blind decoding on all CCEs existing in a control region of the non-DRX subframe on order to receive PDCCH transmitted to the user equipment. Since the user equipment does not know which PDCCH format will be received, it should decode all PDCCHs on possible CCE aggregation levels in every non-DRX subframe until succeeding in the blind decoding of PDCCHs. Moreover, since the user equipment does not know how many CCEs will be used by the PDCCH for the user equipment, the user equipment should attempt detection on all possible CCE aggregation levels until succeeding in the blind decoding of PDCCH.

In LTE system, a concept of a search space (SS) is defined for a blind decoding performed by a user equipment. A search space means a PDCCH candidate configured to be monitored and may have a size different in accordance with each PDCCH format. The search space may be configured with a common search space (CSS) and a UE-specific/dedicated search space (USS). In case of the common search space, all user equipments may be able to know a size of the common search space. On the other hand, the UE-specific search space may be individually set for each user equipment. Hence, a user equipment should monitor both of the UE-specific search space and the common search space to decode PDCCH, thereby performing the blind decoding (BD) in a single frame 44 times to the maximum. In doing so, the blind decoding performed in accordance with a different CRC value (e.g., C-RNTI, P-RNTI, SI-RNTI, RA-RNTI) is not included.

Due to a small search space, it may happen that a base station is unable to reserve CCE resources enough to transmit PDCCH to all user equipments attempting to transmit PDCCH in a given subframe. This is because resources remaining after assignment of CCE positions may not be included in a search space of a specific user equipment. In order to minimize this barrier that may be kept in a next subframe, a UE-specific hopping sequence may apply to a start point of the UE-specific search space.

Table 5 shows sizes of a common search space and a UE-specific search space.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a calculation load of a user equipment due to a blind decoding attempt count, a user equipment does not perform searches in accordance with all the defined DCI formats at the same time. In particular, the user equipment always searches a UE-search space for DCI format 0 and DCI format 1A. In doing so, although the DCI format 0 and the DCI format 1A are equal to each other in size, the user equipment is able to identify DCI formats using flags used to identify the DCI format 0 and the DCI format 1A included in PDCCH [Flags for format 0/format 1A differentiation]. Moreover, DCI formats other than the DCI format 0 or the DCI format 1A may be requested to the user equipment. For example, the requested DCI formats may include DCI format 1, DCI format 1B and DCI format 2.

A user equipment may be able to search a common search space for DCI format 1A and DCI format 1C. Moreover, the user equipment may be configured to search for DCI format 3 or DCI format 3A. In this case, although the DCI format 3/A may have the same size of the DCI format 0/1A, the user equipment may be able to identify a DCI format using CRC scrambled by an identifier other than a UE-specific identifier.

Search space $S_k^{(L)}$ means a PDCCH candidate set in accordance with an aggregation level $L \in \{1,2,4,8\}$. CCE in accordance with a PDCCH candidate set m of the search space may be determined by Formula 1.

$$L \cdot \{(Y_k + m) \bmod \lfloor N_{CCE,k}/L \rfloor\} + i \qquad \text{[Formula 1]}$$

In Formula 1, $M^{(L)}$ indicates the number of PDCCH candidates in accordance with a CCE aggregation level L to be monitored in a search space, where m=0, . . . , $M^{(L)}$−1. The i is an index for designating an individual CCE in each PDCCH candidate in PDCCH and may be represented as 'i=0, . . . , L−1'. Moreover, it is $k = \lfloor n_s/2 \rfloor$ and the $n_s$ indicates a slot index within a radio frame.

In order to decode PDCCH, as mentioned in the foregoing description, a user equipment monitors both a UE-specific search space and a common search space. In this case, the common search space (CSS) supports PDCCHs having the aggregation level of {4, 8}, while the UE-specific search space (USS) supports PDCCHs having the aggregation level of {1, 2, 4, 8}. Table 5 shows PDCCH candidates monitored by a user equipment.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Formula 1, in case of a common search space, for two aggregation levels, L=4 and L=8, $Y_k$ is set to 0. On the contrary, in case of a UE-specific search space, for an aggregation level L, $Y_k$ is defined as Formula 2.

$$Y_k = (A \cdot Y_{k-1}) \bmod D \qquad \text{[Formula 2]}$$

In Formula 2, it is $Y_{-1} = n_{RNTI} \neq 0$ and indicates a value of $n_{RNTI}$ RNTI, where A=39827 and D=65537.

2. Carrier Aggregation Environment 2.1. The General of Carrier Aggregation

Communication environments taken into consideration by embodiments of the present invention include a environment supporting multicarrier. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be configured to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

Serving cell (e.g., PCell, SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has a value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of a higher layer, which contains mobility control information (mobilityControlInfo).

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of a higher layer. E-UTRAN may perform a dedicated signaling having a parameter differing per user equipment rather than a broadcasting in a related SCell.

After an initial security activating process has started, E-UTRAMN may be able to configure a network including at least one SCell in addition to PCell configured in the early stage of a connection establishment process. In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

Figure 6:
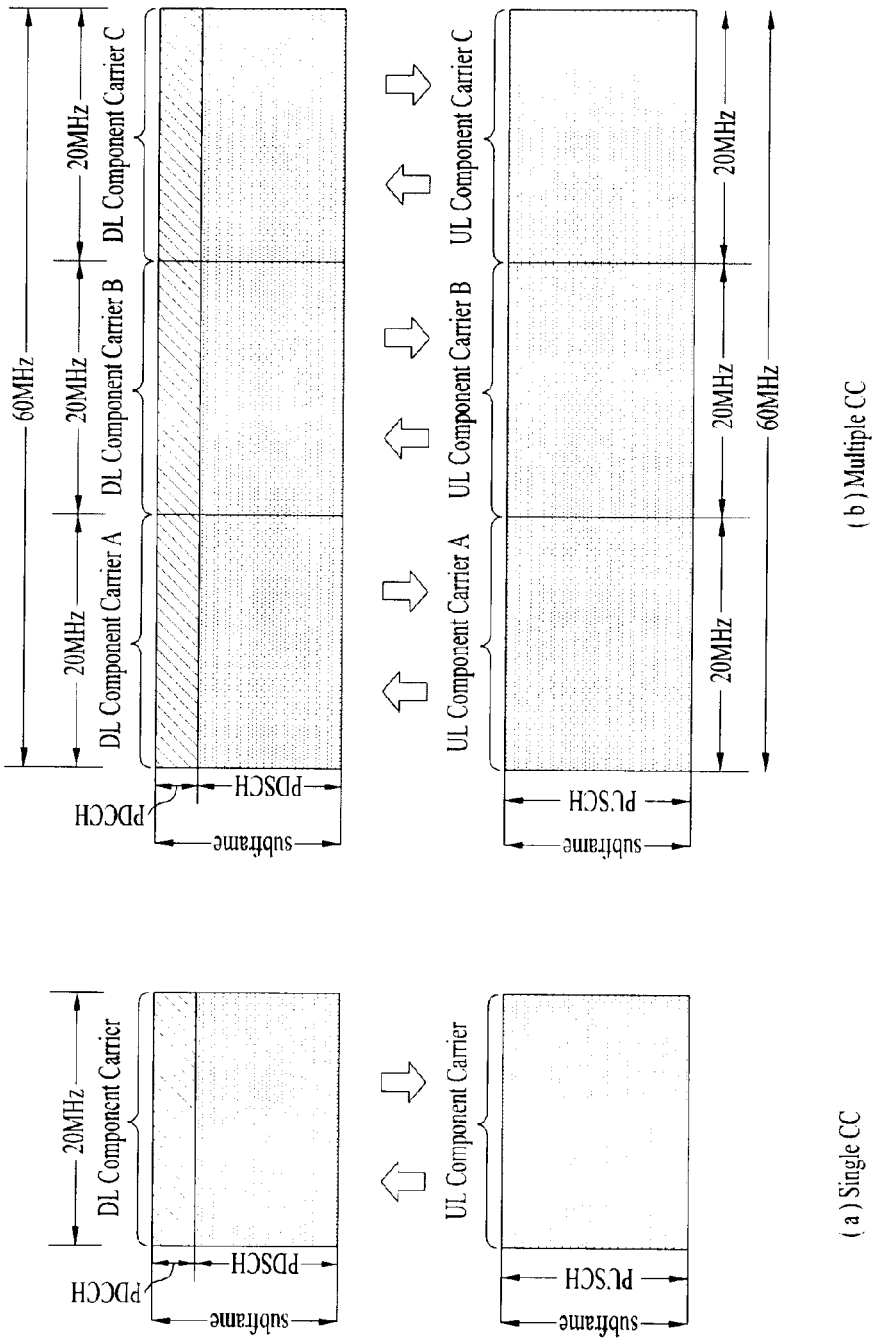
FIG. 6 is a diagram for one example of component carriers (CC) of LTE system and carrier aggregation used by LTE-A system.

FIG. 6 is a diagram for one example of component carriers of LTE system and carrier aggregation used by LTE-A system.

FIG. 6 (*a*) shows a single carrier structure used by LTE system. Component carriers include DL CC and UL CC. One component carrier may have a frequency range of 20 MHz.

FIG. 6 (B) shows a carrier aggregation structure used by LTE-A system. Referring to FIG. 6 (*b*), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, $L \leq M \leq N$) to a user equipment. In doing so, the user equipment may be able to monitor the limited M DL CCs only and receive DL signals. Moreover, a network may be able to assign primary DL CC to the user equipment in a manner of prioritizing L DL CCs (where, $L \leq M \leq N$). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such a higher layer message as an RRC message or system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

2.2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having received the UL grant.

Whether to perform a cross carrier scheduling may be UE-specifically activated or deactivated and may be notified to each user equipment semi-statically via a higher layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 7:
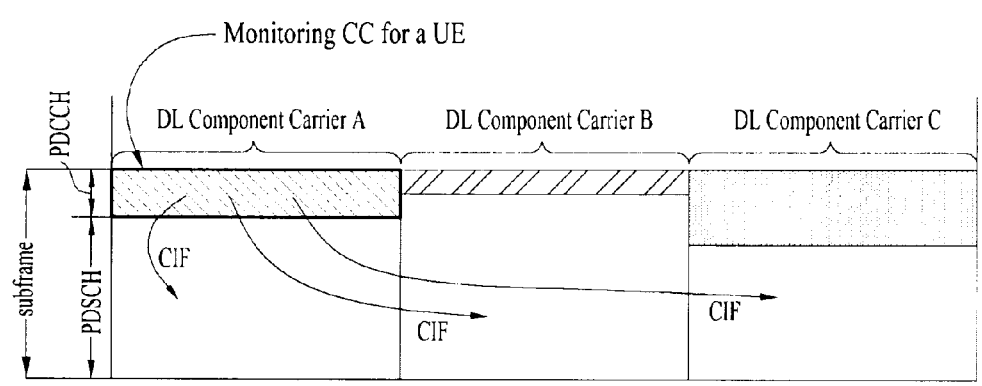
FIG. 7 is a diagram for a subframe structure of LTE-A system in accordance with cross carrier scheduling.

FIG. 7 is a diagram for a subframe structure of LTE-A system in accordance with cross carrier scheduling.

Referring to FIG. 7, a DL subframe for an LTE-A user equipment represents a case that 3 DL CCs are combined and that DL CC 'A' is set as a PDCCH monitoring DL CC. If CIF is not used, each DL CC may be able to transmit a PDCCH for scheduling its PDSCH without the CIF. On the other hand, if a CIF is used via a higher layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

3. The General of UL/DL in TDD System 3.1. UL-DL Configuration in TDD System

In the frame structure type 2, UL-DL configuration indicates that all subframes are assigned to (or reserved for) UL and DL by a prescribed rule. Table 6 shows UL-DL configuration.

Referring to Table 6, in each subframe of a radio frame, 'D' indicates a subframe for DL transmission, 'U' indicates a subframe for UL transmission, and 'S' indicates a special subframe constructed with 3 kinds of fields including DwPTS, GP and UpPTS. UL-DL configurations may be classified into 7 types. And, the respective configurations differ from each other in the positions or number of DL subframes, special frames and UL subframes.

A point of switching DL to UL or a point of switching UL to DL is called a switching point. Switch-point periodicity means a period in which a switching operation between UL and DL subframes is identically repeated and supports both 5 ms and 10 ms. In case of the 5 ms DL-UL switch-point periodicity, a special subframe (S) exists in every half-frame. In case of the 10 ms DL-UL switch-point periodicity, a special subframe (S) exists in a $1^{st}$ half-frame only.

In all configurations, $0^{th}$ subframe, $5^{th}$ subframe and DwPTS are the intervals provided for the DL transmission only. UpPTS and a subframe directly contiguous with a special subframe are the intervals for the UL transmission.

The above-mentioned UL-DL configuration may be known to both a base station and a user equipment. The base station is able to inform the user equipment of the change of the UL-DL assigned state of a radio frame in a manner of transmitting an index of configuration information each time UL-DL configuration information is changed. The configuration information is a sort of DL control information and can be transmitted via PDCCH (physical downlink control channel), which is a DL control channel, like other scheduling information. Moreover, the configuration information is broadcast information and can be commonly transmitted to all user equipments in a cell on a broadcast channel. In the TDD system, the number of half-frames included in a radio frame, the number of subframes included in the half-frame and the combination of DL and UL subframes are just exemplary.

3.2. UL/DL Scheduling in TDD System

Since DL/UL subframe configuration in TDD system differs per UL-DL configuration, PUSCH and PHICH transmission times are set different in accordance with the configuration. And, transmission times of PUSCH and PHICH may be configured different in accordance with an index (or number) of a subframe.

In LTE system, UL/DL timing relations among PUSCH, PDCCH ahead of the PUSCH and PHICH for carrying DL HARQ ACK/NACK corresponding to the PUSCH are determined in advance.

Table 7 is a table indicating transmission timing of PDCCH and PUSCH corresponding to the PDCCH in accordance with UL/DL configuration.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 7

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Referring to Table 7, in case of UL/DL configuration 1 to 6, when a UL grant is received via PDCCH from a base station in $n^{th}$ DL subframe or PHICH is required to be retransmitted after receiving the PHICH, a user equipment transmits PUSCH in n+k UL subframe in response to a DL subframe index in which transmitted the PDCCH (or, PHICH). In this case, a value of k is depicted in Table 7.

In case of UL/DL configuration 0, according to UL index value within a UL DCI format, the number of DL subframe in which PHICH is transmitted, $I_{PHICH}$ value determined by the UL subframe number received by a higher layer or to which PUSCH is transmitted, PUSCH is transmitted in accordance with Table 7, is transmitted in n+7 UL subframe, or is transmitted in both the UL subframe according to Table 7 and the n+7 UL subframe.

Figure 8:
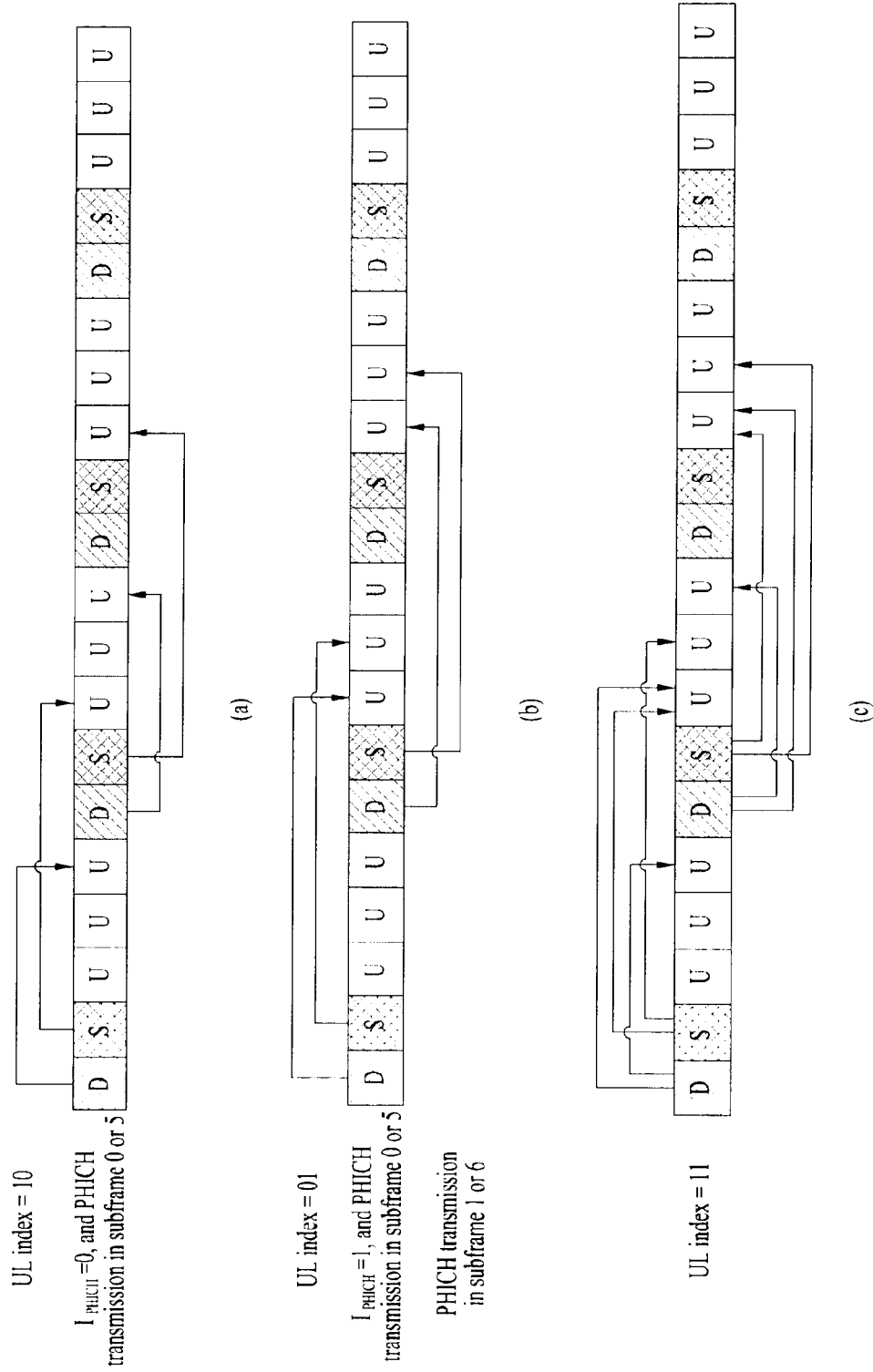
FIG. 8 is a diagram for an example of PUSCH transmitted by a user equipment in a TDD system.

FIG. 8 is a diagram for an example of PUSCH transmitted by a user equipment in a TDD system.

FIG. 8 (a) indicates an example of transmission time of PUSCH in case that a UL index corresponds to 10 or in case that PHICH is transmitted in $0^{th}$ DL subframe or $5^{th}$ DL subframe and $I_{PHICH}$ value corresponds to 0 at this time.

FIG. 8 (b) indicates an example of transmission time of PUSCH in case that a UL index corresponds to 01, in case that PHICH is transmitted in $0^{th}$ DL subframe or $5^{th}$ DL subframe and $I_{PHICH}$ value corresponds to 1 at this time, or in case that PHICH is transmitted in $1^{st}$ DL subframe or $6^{th}$ DL subframe.

FIG. 8 (c) indicates an example of transmission time of PUSCH in case that a UL index corresponds to 11. In this case, a UL grant within each DCI format can simultaneously designate two PUSCHs.

Meanwhile, if a user equipment receives PHICH including HARQ ACK/NACK from a base station in a DL subframe i, the corresponding PHICH may correspond to PUSCH transmitted by the user equipment in a UL subframe i−k. In this case, a value of k is depicted in Table 8.

Table 8 indicates transmission timing relations among PUSCH and PHICH corresponding to the PUSCH in accordance with UL/DL configuration.

TABLE 8

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

In case of UL/DL configuration 1 to 6 or in case of UL/DL configuration 0 and $I_{PHICH}$ value corresponds to 0, if a user equipment receives PHICH on which HARQ-ACK is transmitted from a base station in a subframe i, the PHICH may correspond to PUSCH transmitted by a user equipment in a subframe i−k. On the contrary, in case of UL/DL configuration 0 and $I_{PHICH}$ value corresponds to 1, if a user equipment receives PHICH on which HARQ-ACK is transmitted from a base station in a subframe i, the PHICH may correspond to PUSCH transmitted by a user equipment in a subframe i-6.

If ACK is decoded by receiving PHICH corresponding to a transport block in a DL subframe i after transmitting the transport block via PUSCH subframe corresponding to the DL subframe i or if the transport block is disabled by PDCCH transmitted in the DL subframe i, a user equipment delivers the ACK corresponding to the transport block to a higher layer.

In the aspect of a user equipment, ACK/NACK response (or, PHICH) for a UL transmission, which is transmitted on PUSCH of the user equipment and the like in $n^{th}$ UL subframe, is transmitted from a base station according to a corresponding UL subframe index in a corresponding n+k DL subframe. In case of a subframe bundling, a corresponding PHICH may correspond to a last subframe of a bundle. A user equipment should search/detect/demodulate the corresponding PHICH in a manner of anticipating that PHICH response for PUSCH transmitted by the user equipment is transmitted from a base station in n+k DL subframe. In this case, a value of k is depicted in Table 9.

Table 9 indicates timing relations among PUSCH and PHICH corresponding to the PUSCH in accordance with UL/DL configuration.

TABLE 9

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

PHICH resource is identified by such an index pair as $(n_{PHICH}^{group}, n_{PHICH}^{seq})$. $n_{PHICH}^{group}$ indicates PHICH group number and $n_{PHICH}^{seq}$ indicates an orthogonal sequence index in a corresponding PHICH group. $n_{PHICH}^{group}$ and $n_{PHICH}^{seq}$ can be obtained by Formula 3.

$$n_{PHICH}^{group} = (I_{PRB\_RA} + n_{DMRS}) \mod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \mod 2N_{SF}^{PHICH} \quad \text{[Formula 3]}$$

In this case, $n_{DMRS}$ is mapped from a cyclic shift for a DMRS (demodulation reference signal) field on a latest PDCCH including a UL DCI format for a transport block related to a corresponding PUSCH transmission. On the other hand, when PDCCH including a UL DCI format for an identical transport block does not exist, if an initial PUSCH for the identical transport block is semi-persistently scheduled or is scheduled by a random access approval signal, $n_{DMRS}$ is set to 0.

$N_{SF}^{PHICH}$ indicates a size of a spreading factor used for PHICH modulation.

In case of a first transport block of PUSCH related to PDCCH or in case that the number of transport block passively identified during an absence of a related PDCCH is not identical to the number of transport block indicated by a latest PDCCH related to a corresponding PUSCH, $I_{PRB\_RA}$ can be represented as $I_{PRB\_RA}^{lowest\_index}$. On the other hand, in case of a second transport block of PUSCH related to PDCCH, $I_{PRB\_RA}$ can be represented as $I_{PRB\_RA}^{lowest\_index}1$. In this case, $I_{PRB\_RA}^{lowesr\_index}$ may correspond to a lowest PRB index of a first slot of a corresponding PUSCH transmission.

$N_{PHICH}^{group}$ indicates PHICH group number constructed by a higher layer.

In UL/DL configuration 0 in a TDD system, if PUSCH is transmitted in a subframe index 4 or 9, $I_{PHICH}$ may have a value of 1. Otherwise, it may have a value of 0.

Table 10 is a table indicating a mapping relation between a cyclic shift for a DMRS field used to determine a PHICH resource via PDCCH including a UL DCI format and $n_{DMRS}$.

TABLE 10

| Cyclic Shift for DMRS Field in PD CCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

4. UL/DL Scheduling in TDD System of Multi Cell Environment

As mentioned in the foregoing description, a cross cell scheduling can be UE-specifically performed in a multi cell environment to avoid interference or to efficiently manage a resource. A cross cell scheduling is a scheme of sending UL/DL resource allocation (UL/DL grant) information of a different cell (hereinafter abbreviated, scheduled cell) by a prescribed cell (hereinafter abbreviated, scheduling cell). When the cross cell scheduling for the scheduled cell is supported, the scheduling cell is used for a transmission of PDCCH information including UL/DL grant of the scheduled cell. The scheduling cell means a cell used for a transmission of PHICH corresponding to PUSCH of the scheduled cell. The scheduled cell is used to transmit PUSCH corresponding to PDCCH via the scheduling cell. The scheduled cell means a cell used for a retransmission of PUSCH corresponding to PHICH of the scheduling cell. In this case, the scheduling cell may correspond to the aforementioned PCell. If pluralities of SCells are configured for a user equipment, a prescribed cell among pluralities of the SCells may become the scheduling cell. Yet, the scheduled cell may become a SCell configured for a user equipment but may not become a PCell. The scheduling cell can use a CIF value among DCI format to distinguish PDCCH information including UL/DL grant of the scheduled cell from PDCCH information including UL/DL grant of the scheduling cell. If the cross cell scheduling is performed as mentioned above, HARQ-ACK information of PDSCH/PUSCH scheduled by a corresponding UL/DL grant is transmitted by the scheduling cell only.

Figure 9:
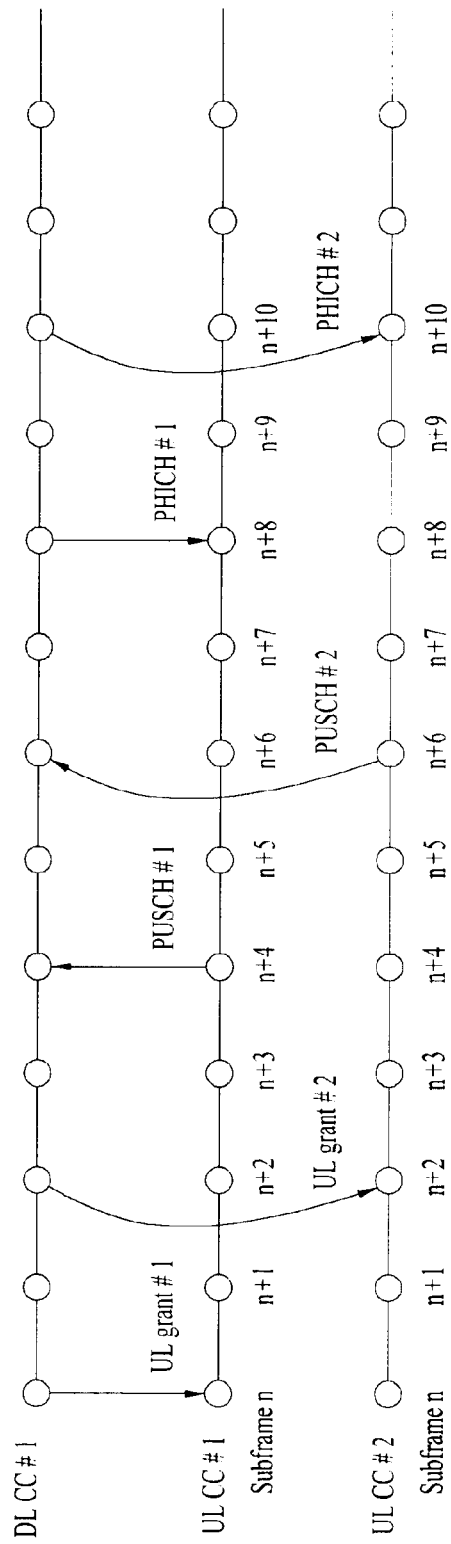
FIG. 9 is a diagram for an example of transmission timing of a UL grant, PUSCH, and PHICH in a FDD system supporting multi cell environment.

FIG. 9 is a diagram for an example of transmission timing of a UL grant, PUSCH, and PHICH in a FDD system supporting multi cell environment.

Referring to FIG. 9, if a specific user equipment receives a UL grant in an $n^{th}$ DL subframe on a DL CC #1, PUSCH is transmitted in a n+4 UL subframe on a corresponding UL CC #1. And, if the PUSCH is transmitted in n+4 UL subframe, PHICH, which is ACK/NACK response for the corresponding PUSCH, is transmitted in a corresponding n+8 DL subframe on a DL CC #1 from a base station.

If a specific user equipment receives a UL grant in a n+2 DL subframe on a DL CC #1 by a cross cell scheduling, PUSCH is transmitted in a n+6 UL subframe on a corresponding UL CC #2. And, if the PUSCH is transmitted in a n+6 UL subframe, PHICH, which is ACK/NACK response for the corresponding PUSCH, is transmitted in a corresponding n+10 DL subframe on a DL CC #1 from a base station. in particular, a user equipment transmits PUSCH via a scheduled cell in a n+6 UL subframe for a UL grant received in a n+2 DL subframe via a scheduling cell and the user equipment should search/detect/demodulate PHICH in a manner of anticipating that a PHICH response for the PUSCH transmitted by the user equipment in a n+10 DL subframe is transmitted from a base station via a scheduling cell.

Yet, since a TDD system supporting legacy multi cell environment considers that each cell uses an identical UL/DL configuration only, there is no problem of transmitting PUSCH and PHICH according to UL/DL scheduling in the aforementioned TDD system. Hence, in case of performing a cross cell scheduling, there is no ambiguity for a transmission time of PUSCH and PHICH. Yet, if all cells use an identical UL/DL configuration, it may bring about a reduction of a cell throughput since UL or DL traffic according to each cell cannot be appropriately managed in consideration of the traffic. Hence, a scheme for enabling each cell to efficiently transmit data using a UL/DL configuration different from each other according to each cell to increase the cell throughput is under discussion.

In case of supporting a cross cell scheduling with a UL/DL configuration different from each other according to each cell, a problem for PUSCH or PHICH transmission time may occur due to existence of a collision subframe between a DL of a prescribed cell and a UL of a different cell. The collision subframe means a subframe configured as a DL subframe in a prescribed cell and configured as a UL subframe in a different cell at the same time in each cell. The collision subframe is applicable to a case that pluralities of SCells are configured for a user equipment as well as a case that one SCell is configured for one user equipment.

Figure 10:
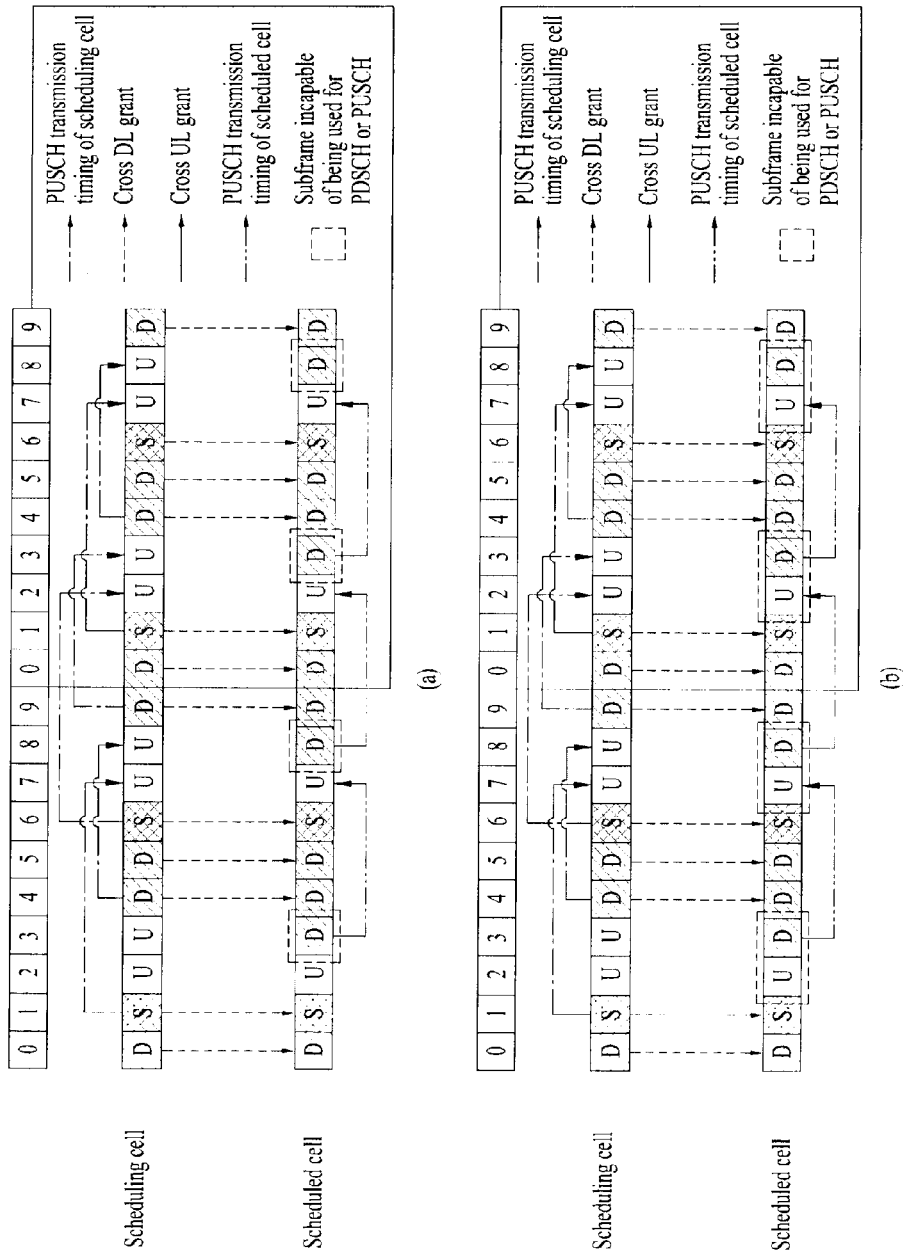
FIG. 10 is a diagram indicating an example of performing a cross cell scheduling in a TDD system supporting multi cell which have an uplink-downlink configuration different from each other.

FIG. 10 is a diagram indicating an example of performing a cross cell scheduling in a TDD system supporting multi cell which has an uplink-downlink configuration different from each other.

FIG. 10 (*a*) indicates a case that PUSCH transmission time of a scheduled cell is calculated on the basis of PUSCH transmission time for a UL grant of a scheduling cell and FIG. 10 (*b*) indicates a case that PUSCH transmission time of a scheduled cell is calculated on the basis of PUSCH transmission time for a UL grant of a scheduled cell.

Referring to FIG. 10 (*a*), UL grant for $3^{rd}$ and $8^{th}$ UL subframe (index 2 and index 7, respectively) of each radio frame of a scheduled cell can be transmitted in $7^{th}$ and $2^{nd}$ DL subframe (index 6 and index 1, respectively) of each radio frame of a scheduling cell. Yet, since DL grant for $4^{th}$ and $9^{th}$ DL subframe (index 3 and index 8, respectively) of each radio frame of the scheduled cell cannot be transmitted in the scheduling cell, it may affect a cross cell scheduling or PDSCH transmission as a constraint condition, thereby reducing efficiency of a cell.

Referring to FIG. 10 (B), on a timing point of transmitting UL grant for $3^{rd}$ and $8^{th}$ UL subframe (index 2 and index 7, respectively) of each radio frame of a scheduled cell, UL grant cannot be transmitted since a scheduling cell is configured as a UL subframe. Since DL grant for $4^{th}$ and $9^{th}$ DL subframe (index 3 and index 8, respectively) of each radio frame of the scheduled cell cannot be transmitted as well, it may affect a cross cell scheduling or PDSCH and PUSCH transmission as a constraint condition, thereby reducing efficiency of a cell.

Consequently, the aforementioned problem may occur irrespective of PUSCH transmission timing on the basis of any cell in a situation of a UL/DL configuration different from each other. As the number of SCell configured for a user equipment increases, the aforementioned problem may become worse.

The present invention proposes a new cross cell scheduling method to solve a problem, which may occur due to a collision subframe in case of performing a cross cell scheduling when UL/DL configuration different from each other is configured for each cell. In the following each embodiment, assume that UL/DL configuration different from each other is used for a plurality of cells configured for a user equipment.

4.1. Method of Cross Cell Scheduling in a TDD System Supporting Multi Cell Environment FIG. 11 is a flowchart for a method of a cross cell scheduling in a TDD system supporting multi cell environment according to one embodiment of the present invention.

Figure 11:
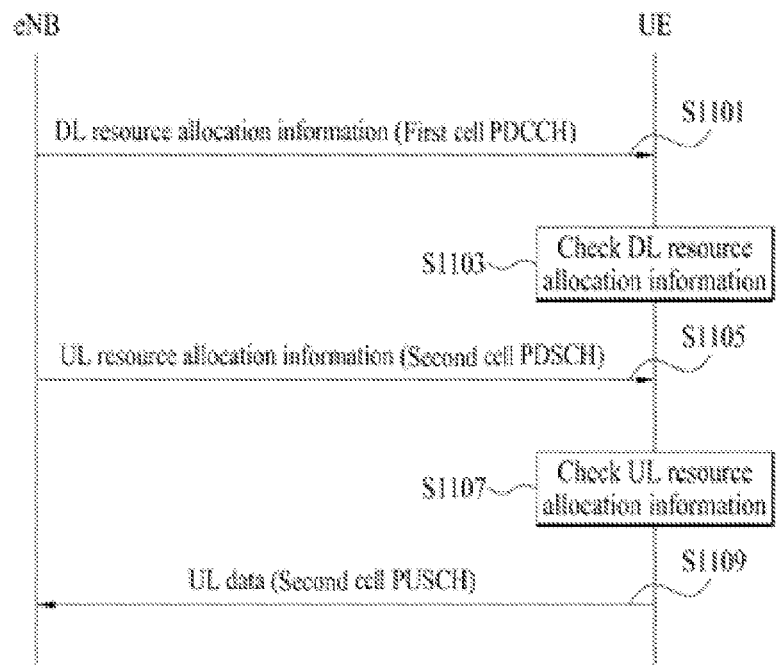
FIG. 11 is a flowchart for a method of a cross cell scheduling in a TDD system supporting multi cell environment according to one embodiment of the present invention.

Referring to FIG. 11, a base station transmits DL resource allocation information (DL grant) configured to schedule PDSCH of a scheduled cell among a plurality of cells configured for a user equipment to the user equipment via PDCCH of a scheduling cell [S1101]. In this case, the PDSCH transmitted via the scheduled cell includes a UL grant configured to schedule PUSCH of the scheduled cell configured for the user equipment.

Having received PDCCH from the eNB via the scheduling cell, the user equipment checks the DL resource allocation information (DL grant) included in the PDCCH [S1103]. By doing so, the DL grant transmitted by the eNB may have a UL grant format. If the user equipment receives the resource allocation information including the UL grant format on a specific timing, the user equipment can judge the resource allocation information not as the UL grant but as the DL grant. As mentioned in the foregoing description, a method of transmitting the DL grant via PDCCH of the scheduling cell for the eNB to schedule PDSCH including the UL grant of the scheduled cell or a method for the user equipment to check DL grant information received from the eNB is described in detail in the following description (4.2.).

Subsequently, the eNB transmits the PDSCH scheduled by the DL grant, which is transmitted via the PDCCH of the scheduling cell in the step S1101, to the user equipment via the scheduled cell [S1105]. As mentioned earlier, the PDSCH includes the UL grant configured to schedule the PUSCH of the scheduled cell configured for the corresponding user equipment. In particular, the eNB uses the PDSCH of the scheduled cell to transmit UL grant information of the scheduled cell.

Having received the PDSCH from the eNB via the scheduled cell, the user equipment checks UL resource allocation information (UL grant) included in the PDSCH [S1107]. Having checked the UL grant information included in the PDSCH, the user equipment transmits UL data to the eNB on PUSCH of the scheduled cell according to the UL grant [S1109].

A method of transmitting the UL grant to the user equipment in a manner of including the UL grant in the PDSCH or a method for the user equipment to check the UL grant transmitted from the eNB via the PDSCH is described in detail in the following description (4.3.).

The aforementioned series of processes can be conceptually explained in FIG. 12 as follows.

Figure 12:
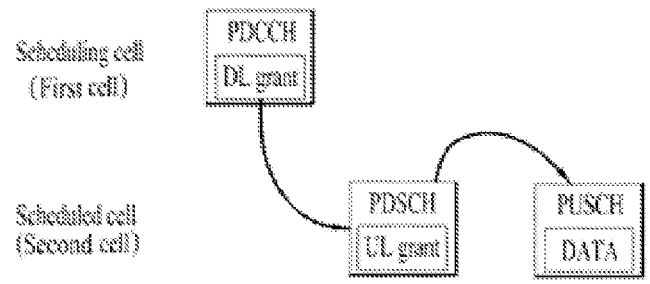
FIG. 12 is a conceptual diagram for a method of a cross cell scheduling in a TDD system supporting multi cell environment according to one embodiment of the present invention.

FIG. 12 is a conceptual diagram for a method of a cross cell scheduling in a TDD system supporting multi cell environment according to one embodiment of the present invention.

Referring to FIG. 12, in order to perform the aforementioned cross cell scheduling method, the eNB transmits the DL grant configured to schedule the PDSCH of the scheduled cell in which the UL grant is included to the user equipment via PDCCH of the scheduling cell. The eNB transmits the PDSCH of the scheduled cell in which the UL grant is included according to the DL grant included in the PDCCH. Having received the PDSCH, the user equipment transmits the PUSCH of the scheduled cell to the eNB according to the UL grant included in the PDSCH.

4.2. PDCCH Configured to Schedule PDSCH of Scheduled Cell in which UL Grant is Included 4.2.1. PDCCH Configuration In case that a plurality of scheduled cells are configured for a user equipment, PDCCH configured to schedule PDSCH of a scheduled cell in which a UL grant is included can include a carrier indicator field (CIF) to distinguish a cell transmitting PDSCH among a plurality of cells. And, the PDCCH can use a DCI format 1A included in the PDCCH or can use the DCI format 1A in a manner of modifying the DCI format 1A. In the following description, a DCI format included in the PDCCH, which is configured to schedule the PDSCH of the scheduled cell in which the UL grant is included, is named a virtual DCI format 1A. A method of configuring the virtual DCI format 1A is explained in detail in the following description.

The DCI format 1A used for the present invention can differently configure 1-bit flag of the virtual DCI format 1A from that of a DCI format 1A to distinguish from the DCI format 1A configured to transmit a DL grant of a normal cross cell scheduling. For instance, the 1-bit flag of the virtual DCI format 1A may have a value of 0.

Specifically, the 1-bit flag of a legacy DCI format 0 or a DCI format 1A is used to distinguish the DCI format 1A from the DCI format 0. Yet, if a CIF is configured (in case that a cross cell scheduling is configured) and if a timing point of receiving PDCCH received via a scheduling cell is defined as not identical to a timing of transmitting PUSCH in a subframe of a scheduled cell in terms of a time or a subframe index, a user equipment can recognize that a UL grant is used for a different usage. Hence, the virtual DCI format 1A of which the 1-bit flag is differently configured can be recognized by the user equipment as the DCI format 0 transmitted to transmit the UL grant of the scheduled cell. In particular, if the user equipment receives the DCI format 0 in a specific subframe where the PUSCH transmission timing (or, the UL grant) of the scheduled cell is not defined, the user equipment can recognize it as the virtual DCI format 1A of the present invention and can perform a cross cell scheduling of the scheduled cell, which is mapped to a CIF, using a CIF value of the PDCCH including the virtual DCI format 1A.

More specifically, as depicted in Table 7, according to a timing (subframe) of receiving PDCCH received in accordance with a UL/DL configuration, a timing (subframe) of transmitting PUSCH corresponding to the timing of receiving PDCCH is determined. Hence, if the timing (subframe) of transmitting PUSCH transmitted according to the UL/DL configuration of the scheduled cell is not defined on a timing (subframe) identical to the timing (subframe) of receiving PDCCH received via the scheduling cell, the user equipment, which received the PDCCH including a flag value of 0 configured to distinguish the DCI format 0 from the DCI format 1A, can judge that corresponding resource allocation information is used for a different usage, i.e., DL resource allocation information configured to schedule PDSCH of the scheduled cell including the UL grant. For instance, referring to Table 7, in case that the UL/DL configuration of the scheduled cell corresponds to 0, when the user equipment receives control information including a flag value of 0 configured to distinguish the DCI format 0 from the DCI format 1A via the scheduling cell in a subframe corresponding to an index 2, since a UL transmission timing is not defined, the user equipment can judge the control information as information configured to schedule the PDSCH of the scheduled cell.

In the following description, information transmitted via a virtual DCI format 1A is explained.

1) A carrier indicator—consists of 0 or 3 bits.

2) A flag to distinguish a DCI format 0 from a DCI format 1A—consists of 1 bit, the virtual DCI format 1A of the present invention has a value of 0.

3) A localized/distributed virtual resource block (VRB) assignment flag—consists of 1 bit.

4) Resource block assignment—bit number is determined by Formula 4 as follows.

$$\lceil \log_2(N_{RB}^{DL}(N_{RB}^{DL}+1)/2) \rceil \quad \text{[Formula 4]}$$

In this case, in case of the localized virtual resource block, the bit number for resource block assignment is determined by the aforementioned Formula 4.

In case of the distributed virtual resource block, if a DL resource block icating a DL frequency band configuration is less than 50 ($N_{RB}^{DL}<50$) or if DCI format 1A CRC is scrambled to RA-RNTI (random access-RNTI), P-RNTI (paging-RNTI), or SI-RNTI (system information-RNTI), the bit number for resource block assignment is determined by the aforementioned Formula 4.

On the contrary, in case of remaining cases, 1 bit, which corresponds to a MSB (most significant bit), indicates a gap value for dispersing in case of mapping a virtual resource block to a physical resource block. In this case, '0' indicates $N_{gap}=N_{gap,1}$ and '1' indicates $N_{gap}=N_{gap,2}$. And, the bit number for resource block assignment is determined by Formula 5 as follows.

$$(\lceil \log_2(N_{RB}^{DL}(N_{RB}^{DL}+1)/2) \rceil - 1) \quad \text{[Formula 5]}$$

5) Modulation and Coding Scheme (MCS)—Consists of 5 Bits.

In this case, HARQ process number consists of 3 bits and 4 bits in a FDD system and a TDD system, respectively. New data indicator consists of 1 bit.

The new data indicator may vary according to whether the virtual DCI format 1A CRC is scrambled to RA-RNTI, P-RNTI, or SI-RNTI.

In case that the virtual DCI format 1A CRC is scrambled to RA-RNTI, P-RNTI, or SI-RNTI, if a DL resource block is equal to 50 or greater than 50 ($N_{RB}^{DL} \geq 50$) and the localized/distributed virtual resource block assignment flag is set to 1, the new data indicator indicates a gap value. In this case, '0' indicates $N_{gap}=N_{gap,1}$ and '1' indicates $N_{gap}=N_{gap,2}$. Otherwise, the new data indicator is reserved.

On the contrary, if the virtual DCI format 1A CRC is not scrambled to RA-RNTI, P-RNTI, or SI-RNTI, the new data indicator can be configured in advance.

6) Redundancy version—consists of 2 bits.

7) Transmit power control (TPC) for PUCCH—consists of 2 bits.

In this case, in case that the virtual DCI format 1A CRC is scrambled to RA-RNTI, P-RNTI, or SI-RNTI, an MSB of a TPC command is reserved and a LSB (least significant bit) of the TPC command indicates a column according to a value of $N_{PRB}^{1A}$ in a table indicating a transport block size. In this case, if the LSB is '0', $N_{PRB}^{1A}$ corresponds to '2'. Otherwise, $N_{PRB}^{1A}$ corresponds to '3'.

On the other hand, if the virtual DCI format 1A CRC is not scrambled to RA-RNTI, P-RNTI, or SI-RNTI, 2 bits including MSB indicates the TPC command.

8) A DL assignment index—consists of 2 bits.

In this case, although the DL assignment index exists in a TDD system for all DL/UL configurations, is applicable to TDD operation including UL/DL configuration 1 to 6 only.

9) A sounding reference signal (SRS) request—consists of 0 or 1 bit.

Information bit in the aforementioned virtual DCI format 1A may belong to a prescribed one of a size set consisting of {12, 14, 16, 20, 24, 26, 32, 40, 44, and 56}. In this case, if the number of information bit in the virtual DCI format 1A is less than the number of information bit in the DCI format 0, '0' can be appended to the information bit in the virtual DCI format 1A until the number of information bit in the virtual DCI format 1A has a payload identical to that of the number of information bit in the DCI format 0. And, if the number of information bit in the virtual DCI format 1A belongs to a prescribed one of the aforementioned size set, a single 0 bit can be appended to the virtual DCI format 1A.

In case that the virtual DCI format 1A CRC is scrambled to RA-RNTI, P-RNTI, or SI-RNTI, a field for the HARQ process number and a field for the downlink assignment index can be reserved.

4.2.2 DL Subframe Indicated by Virtual DCI Format 1A

A position (or, an index) of a DL subframe of a scheduled cell indicated by a virtual DCI format 1A means a DL subframe capable of being transmitted a UL grant, which is a first (or preceding first) appearing UL grant after the virtual DCI format 1A is transmitted.

Figure 13:
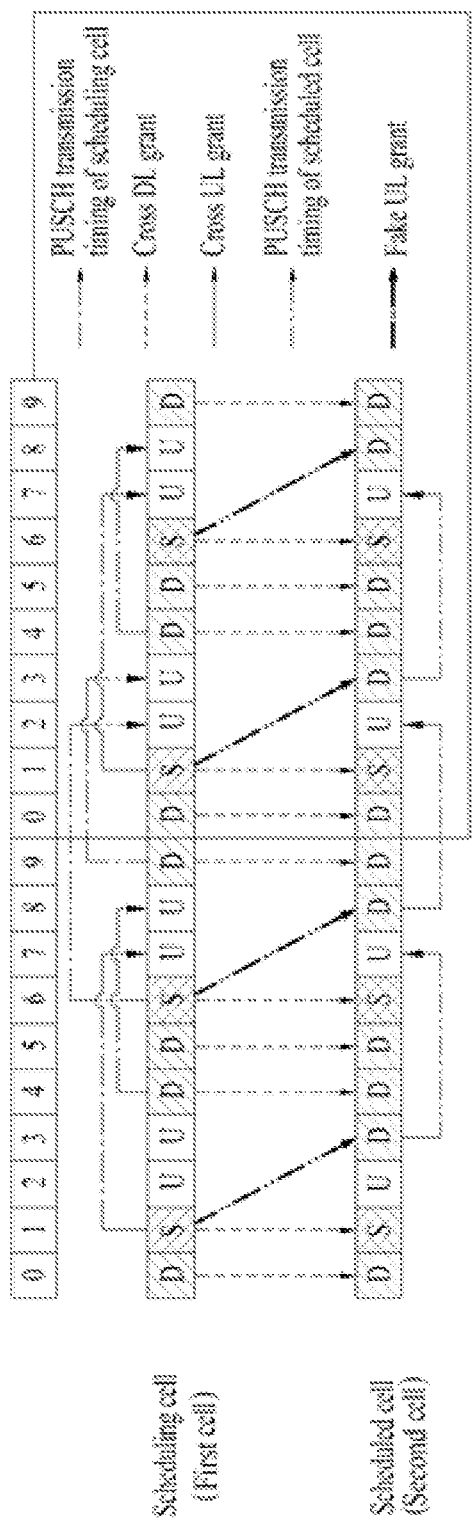
FIG. 13 is a diagram for an example of a cross cell scheduling using a virtual DCI format 1A according to one embodiment of the present invention.

FIG. 13 is a diagram for an example of a cross cell scheduling using a virtual DCI format 1A according to one embodiment of the present invention.

Referring to FIG. 13, a DL grant can be transmitted from a base station in a first (index 0) subframe of each radio frame using a PDCCH DCI format 1A. Having received the DL grant from a scheduling cell, a user equipment can schedule PDSCH of a scheduled cell. In particular, the user equipment receives the PDSCH from the base station in a first subframe of the scheduled cell.

A DL grant for a second PDSCH of the scheduled cell can be transmitted from a base station in a second (index 1) in each radio frame using PDCCH DCI format 1A of a second subframe of a scheduling cell and a virtual DCI format 1A is simultaneously transmitted. In this case, a DL subframe indicated by the virtual DCI format 1A means a latest or a first preceding DL subframe in which a UL grant can be transmitted after the subframe in which the virtual DCI format 1A is transmitted. In particular, in FIG. 13, it means a $4^{th}$ (index 3) subframe in each radio frame. In this case, a corresponding user equipment can decode a $4^{th}$ (index 3) PDSCH in each radio frame using the virtual DCI format 1A. By doing so, the user equipment can obtain UL grant information (or, a fake UL grant). Since the UL grant obtained by the user equipment includes scheduling information on a $8^{th}$ (index 7) UL subframe in each radio frame of the scheduled cell, the user equipment can transmit PUSCH in a corresponding UL subframe. A cross cell scheduling for subsequent subframes can be performed by the aforementioned process. By doing so, the user equipment can perform the cross cell scheduling irrespective of whether the UL/DL configuration is different from each other between a plurality of cells.

4.3. UL Transmission Via PDSCH of Scheduled Cell

4.3.1. Modulation and Coding Scheme (MCS), Coding Rate Configuration

A UL grant transmitted via PDSCH of a scheduled cell can be mapped to a PDSCH region in a manner of applying a coding scheme, a code rate, and a modulation order in case of transmitting the UL grant to PDCCH of a scheduling cell.

In case of transmitting data to PDSCH of the scheduled cell in which the UL grant is included, the UL grant transmitted via the PDSCH can be mapped to the PDSCH region by performing a joint coding with the data. When the UL grant and the data are jointly coded, a coding scheme and a code rate can be configured by methods as follows.

1) An UL grant and data, which are jointly coded, may be coded in a manner of maintaining a MCS level of PDSCH, which is identical to the MCS level when the UL grant is not transmitted. Due to the UL grant added by identically maintaining the MCS level of PDSCH, the total number of RB (or, RE) assigned to the UL grant and the data can be increased.

2) In case of transmitting the UL grant and the data together, the MCS level may be calculated again. By calculating the MCS level again, the number of RB (or, RE) to which the UL grant and the data to be transmitted together can be maintained with a number identical to the number of RB (or, RE) in case of transmitting the data only without the UL grant.

3) PDSCH including the UL grant may be configured with a coding scheme or a code rate identical to a MCS level of PDCCH of a subframe in which the UL grant is transmitted.

4) PDSCH including the UL grant may be configured with a coding scheme or a code rate identical to a lately transmitted MCS level of PDCCH of a DL subframe before the UL grant is transmitted.

5) PDSCH including the UL grant may be configured with a coding scheme or a code rate identical to a lately transmitted MCS level in the UL grant before the UL grant is transmitted.

4.3.2. Resource Mapping of UL Grant

Since a maximum bit of a DCI format including a UL grant is fixed according to a system bandwidth, the number of RB (or, RE) to which the UL grant is mapped can be fixed according to the number of maximum bit of the DCI format in which the UL grant is included. In this case, the maximum bit of the DCI format in which the UL grant is included may or may not include a CRC parity bit. Hence, a prescribed number of RB (or, RE) can be assigned to transmit the UL grant according to a system bandwidth in a subframe in which PDSCH including the UL grant is transmitted and a user equipment can obtain the UL grant in a corresponding RB (or, RE).

A position of the RB (or, RE) occupied by the UL grant may correspond to a first part or a last part of an RB (or, RE) occupied by data.

Figure 14:
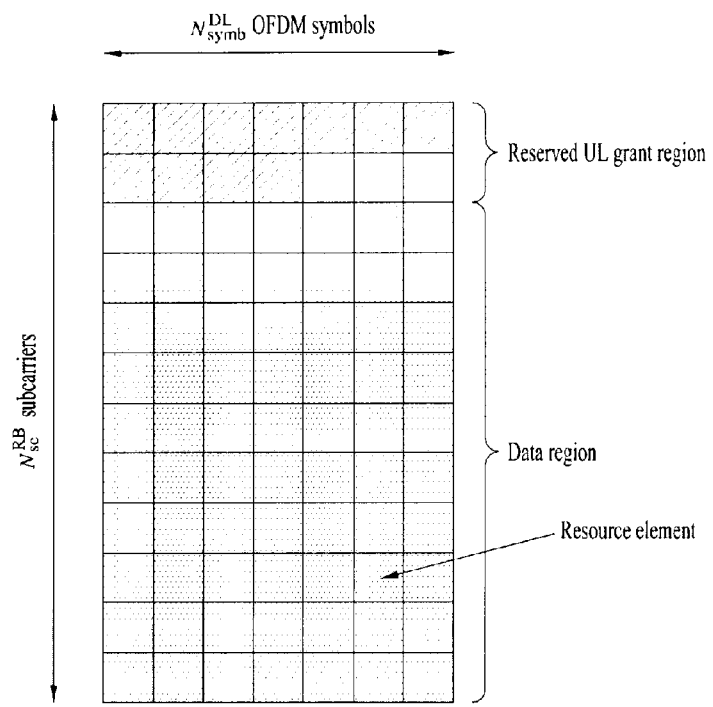
FIG. 14 is a diagram for an example of a resource mapping of UL grant and data when the UL grant according to one embodiment of the present invention is transmitted via PDSCH.

FIG. 14 is a diagram for an example of a resource mapping of UL grant and data when the UL grant according to one embodiment of the present invention is transmitted via PDSCH.

Referring to FIG. 14, a prescribed region on PDSCH, i.e., a first part of RE (the RE belongs to a first and second subcarrier) occupied by data indicates an example of a region configured as a UL grant region. In this case, it can be identically applicable in case that an allocation unit is configured as an RB.

And, a base station can semi-statically configure a UL grant region transmitted via PDSCH via an RRC (radio resource control) signaling. Hence, a user equipment can obtain a UL grant within PDSCH using information on the UL grant region received via the RRC signaling.

5. The General of Device Implementable by the Present Invention

Figure 15:
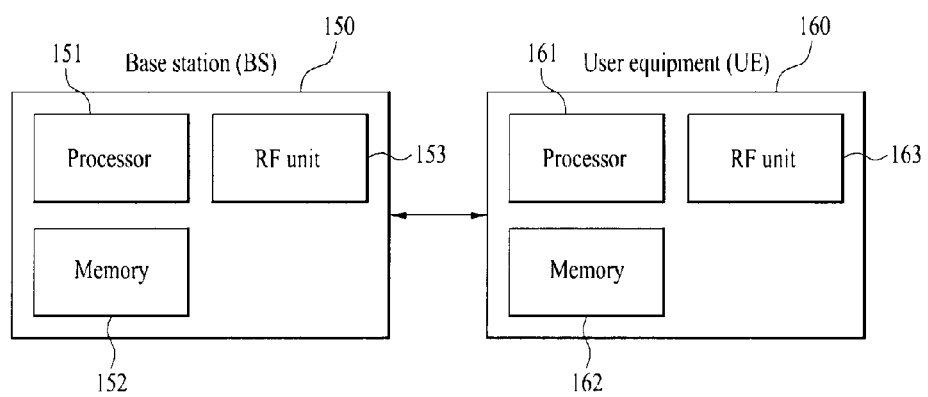
FIG. 15 is a block diagram for a configuration of a wireless communication device according to one embodiment of the present invention.

FIG. 15 is a block diagram for a configuration of a wireless communication device according to one embodiment of the present invention.

Referring to FIG. 15, a wireless communication system includes a base station 150 and a plurality of user equipments 160 positioned at a region of the base station 150.

The base station 150 includes a processor 151, a memory 152, and a RF (radio frequency) unit 153. The processor 151 is configured to implement a proposed function, a procedure and/or a method. Layers of a radio interface protocol can be implemented by the processor 151. The memory 152 is connected with the processor 151 and stores various informations to drive the processor 151. The RF unit 153 is connected with the processor 151 and is configured to transmit/receive a radio signal.

The user equipment 160 includes a processor 161, a memory 162, and a RF (radio frequency) unit 163. The processor 161 is configured to implement a proposed function, a procedure and/or a method. Layers of a radio interface protocol can be implemented by the processor 161. The memory 162 is connected with the processor 161 and stores various informations to drive the processor 161. The RF unit 163 is connected with the processor 161 and is configured to transmit/receive a radio signal.

The memory 152/162 can be positioned at an inside or an outside of the processor 151/161 and can be connected to the processor 151/161 with a well-known means. And, the base station 150 and/or the user equipment 160 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although a method of transmitting/receiving data in a wireless access system according to the present invention and apparatus therefor are described with reference to examples applied to 3GPP LTE system, it may be applicable to various kinds of wireless communication systems as well as the 3GPP LTE system.

What is claimed is:

1. A method of transmitting data by a user equipment in a time division duplex (TDD) wireless communication system supporting multiple cells, the user equipment being configured with a plurality of cells including a first cell and a second cell, the method comprising:
    receiving resource allocation information including a flag value indicating uplink resource allocation information via a physical downlink control channel (PDCCH) from a base station, when performing cross cell scheduling for the second cell via the first cell according to an uplink-downlink configuration of the first cell;
    determining that the resource allocation information is downlink resource allocation information, when the resource allocation information is received at a subframe timing for which an uplink transmission timing is not defined based on an uplink-downlink configuration of the second cell;
    receiving the uplink resource allocation information from the base station via a physical downlink shared channel (PDSCH) of the second cell according to the downlink resource allocation information; and
    transmitting uplink data to the base station via a physical uplink shared channel (PUSCH) of the second cell according to the uplink resource allocation information,
    wherein when the uplink resource allocation information is transmitted together with downlink data, the uplink resource allocation information is joint-coded with the downlink data, and
    wherein a modulation and coding scheme (MCS) level used for the joint coding is identical to a MCS level used when the uplink resource allocation information is not transmitted via the PDSCH.

2. The method of claim 1, wherein a subframe in which the PDSCH is received on the second cell corresponds to a subframe which is first available after a subframe in which the PDCCH is received.

3. The method of claim 1, wherein the MCS level used for the joint coding is determined to be a value for identically maintaining the number of resource used when the uplink resource allocation information is not transmitted via the PDSCH.

4. The method of claim 1, wherein the MCS level used for the joint coding is identical to a MCS level used for PDCCH of a subframe in which the PDSCH is transmitted.

5. The method of claim 1, wherein the MCS level used for the joint coding is identical to a MCS level used for a most recently transmitted PDCCH before the PDSCH is transmitted.

6. The method of claim 1, wherein the MCS level used for the joint coding is identical to a MCS level used for most recently transmitted uplink resource allocation information before the PDSCH is transmitted.

7. The method of claim 1, wherein the number of resource or a position of a resource region to which the uplink resource allocation information is mapped is predetermined or is configured by a higher layer signaling.

8. A user equipment configured to transmit data in a wireless communication system supporting multiple cells, the user equipment being configured with a plurality of cells including a first cell and a second cell, and comprising:
    a radio frequency (RF) unit configured to transmit and receive a radio signal; and
    a processor configured to:
        receive resource allocation information including a flag value indicating uplink resource allocation information via a physical downlink control channel (PDCCH) from a base station, when cross cell scheduling for the second cell via the first cell according to an uplink-downlink configuration of the first cell is configured for the user equipment,
        determine that the resource allocation information is downlink resource allocation information, when the resource allocation information is received at a subframe timing for which an uplink transmission timing is not defined based on an uplink-downlink configuration of the second cell,
        receive the uplink resource allocation information from the base station via a physical downlink shared channel (PDSCH) of the second cell according to the downlink resource allocation information, and
        transmit uplink data to the base station via a physical uplink shared channel (PUSCH) of the second cell according to the uplink resource allocation information,
    wherein when the uplink resource allocation information is transmitted together with downlink data, the uplink resource allocation information is joint-coded with the downlink data, and
    wherein a modulation and coding scheme (MCS) level used for the joint coding is identical to a MCS level used when the uplink resource allocation information is not transmitted via the PDSCH.

9. The user equipment of claim 8, wherein a subframe in which the PDSCH is received on the second cell corresponds to a subframe which is first available after a subframe in which the PDCCH is received.

10. The user equipment of claim 8, wherein the MCS level used for the joint coding is determined to be a value for identically maintaining the number of resource used when the uplink resource allocation information is not transmitted via the PDSCH.

11. The user equipment of claim 8, wherein the MCS level used for the joint coding is identical to a MCS level used for PDCCH of a subframe in which the PDSCH is transmitted.

12. The user equipment of claim 8, wherein the MCS level used for the joint coding is identical to a MCS level used for a most recently transmitted PDCCH before the PDSCH is transmitted.

13. The user equipment of claim 8, wherein the MCS level used for the joint coding is identical to a MCS level used for most recently transmitted uplink resource allocation information before the PDSCH is transmitted.

14. The user equipment of claim 8, wherein the number of resource or a position of a resource region to which the uplink resource allocation information is mapped is predetermined or is configured by a higher layer signaling.

* * * * *